US011321722B2

(12) United States Patent
Wu et al.

(10) Patent No.: US 11,321,722 B2
(45) Date of Patent: May 3, 2022

(54) ASSORTMENT OPTIMIZATION USING INCREMENTAL SWAPPING WITH DEMAND TRANSFERENCE (71) Applicant: ORACLE INTERNATIONAL CORPORATION, Redwood Shores, CA (US)

(72) Inventors: Su-Ming Wu, Waltham, MA (US); Saraswati Yagnavajhala, Johns Creek, GA (US)

(73) Assignee: Oracle International Corporation, Redwood Shores, CA (US)

( * ) Notice: Subject to any disclaimer, the term of this patent is extended or adjusted under 35 U.S.C. 154(b) by 1073 days.

(21) Appl. No.: 14/600,099

(22) Filed: Jan. 20, 2015

(65) Prior Publication Data

US 2016/0210640 A1 Jul. 21, 2016

(51) Int. Cl.
*G06Q 30/02* (2012.01)
*G06Q 10/06* (2012.01)
*G06Q 10/08* (2012.01)

(52) U.S. Cl.
CPC ... *G06Q 30/0202* (2013.01); *G06Q 10/06375* (2013.01); *G06Q 10/087* (2013.01)

(58) Field of Classification Search
None
See application file for complete search history.

(56) References Cited

U.S. PATENT DOCUMENTS

| | | | | |
|---|---|---|---|---|
| 2005/0114196 | A1* | 5/2005 | Schoenmeyr | G06Q 10/04 705/7.29 |
| 2007/0027745 | A1* | 2/2007 | Ouimet | G06Q 10/04 705/7.31 |
| 2009/0271245 | A1* | 10/2009 | Joshi | G06Q 30/02 705/7.31 |

(Continued)

OTHER PUBLICATIONS

Benjaafar, S., Kim, J., Vishwanadham, N. "On the effect of Product Variety in Production-Inventory Systems". Annals of Operations Research, vol. 126, Kluwer Academic Publishers, 2004, p. 71-101. (Year: 2004).*

(Continued)

*Primary Examiner* — Cory W Eskridge
(74) *Attorney, Agent, or Firm* — Kraguljac Law Group, LLC (57) ABSTRACT Systems, methods, and other embodiments associated with incrementally swapping items in an assortment are described. In one embodiment, a computing system includes demand logic configured to read data from an electronic data structure that defines an assortment. The assortment defines a subset of items from a product category. The demand logic is configured to generate forecasted changes to an associated metric value by generating demand transference values for (i) individually removing each item presently in the assortment and (ii) individually adding each item of a set of available items of the product category. The computing system includes assortment logic configured to transform the electronic data structure that defines the assortment according to the forecasted changes by incrementally swapping (Continued)

items in the assortment for new items in the available set of items until the forecasted changes between items in the assortment and new items in the set of available items satisfy a predefined condition.

20 Claims, 5 Drawing Sheets

(56) References Cited

U.S. PATENT DOCUMENTS

| | | | |
|---|---|---|---|
| 2011/0238459 A1* | 9/2011 | Bottom | G06Q 10/04 705/7.29 |
| 2011/0276364 A1* | 11/2011 | Bergstrom | G06Q 10/04 705/7.29 |
| 2013/0018700 A1* | 1/2013 | Ervolina | G06Q 10/06 705/7.31 |
| 2013/0275277 A1* | 10/2013 | Mihic | G06Q 10/06313 705/28 |
| 2014/0058781 A1* | 2/2014 | Padmanabhan | G06Q 10/06312 705/7.22 |
| 2014/0358633 A1 | 12/2014 | Wu et al. | |

OTHER PUBLICATIONS

Bai, R., Kendall, G. "An Investigation of Automated Planograms using a Simulated Annealing based Hyper-Heuristic." Operations Research/Computer Science Interfaces Series, Jan. 2005. (Year: 2005).*

Yucel, E. Karaesmen, F., Salman, F.S., Turkay, M. "Optimizing Product Assortment under Customer-Driven Demand Substitution." European Journal of Operational Research, vol. 199, 2009, p. 759-768. (Year: 2009).*

Chong, J.K., Ho, T.H., Tang, C.S. "A Modeling Framework for Category Assortment Planning." Manufacturing & Service Operations Management, vol. 3, No. 3, Summer 2001, pp. 191-210. (Year: 2001).*

Belloni, A., Freund, R., Selove, M., Simester, D. "Optimizing Product Line Designs—Efficient Methods and Comparisons." Management Science, vol. 54, No. 9, Sep. 2008, pp. 1544-1552. (Year: 2008).*

Miyamoto, Y., Kubo, M., Itoh, S., Murakami, K. "Algorithms for the Item Assortment Problem: An Application to Vending Machine Products." Japan Journal of Industrial and Applied Mathematics, vol. 20, 2003, pp. 87-100. (Year: 2003).*

Fisher, M., Vaidyanathan, R. "A Demand Estimation Procedure for Retail Assortment Optimization with Results from Implementations." Management Science, vol. 60, is. 10, Oct. 2014, pp. 2401-2415 (Year: 2014).*

Gun, et al., "Assortment Planning Using Data Mining Algorithms", Jul. 27, 2008, PICMET 2008 Proceedings. (Year: 2008).*

* cited by examiner

ASSORTMENT OPTIMIZATION USING INCREMENTAL SWAPPING WITH DEMAND TRANSFERENCE

BACKGROUND

In the retail industry, an assortment is a set of items in a particular category that a retailer chooses to sell. For example, in a grocery store, the retailer sells a particular selection of yogurt items in a yogurt assortment out of thousands of possible yogurt items that are currently manufactured. Similarly, the retailer selects assortments for all categories of products carried in a store, such as, tea, milk, beer, chocolate, and so on. In general, the retailer typically limits the items selected for the various assortments since all available items cannot be physically held in inventory due to space restrictions and other logistical reasons.

Therefore, the retailer is tasked with selecting which items to include in an assortment and/or how to improve an existing assortment with new or different items. However, simply adding and/or removing items is not guaranteed to improve an assortment. That is, adding items and/or removing items have different effects on the assortment as a whole. For example, adding one item may steal sales from another item, while not increasing overall sales. Accordingly, difficulties exist for managing assortments including how to select items for an assortment.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Systems, methods and other embodiments are described herein that optimize items in an assortment by incrementally swapping items into the assortment according to demand transference values. In one embodiment, a retailer provides an initial assortment that is to be optimized. In general, a product assortment includes a plurality of items in a particular category (e.g., a type of product) that a retailer chooses to sell. For example, a selection of yogurts for sale by a retailer is the yogurt assortment, which is a subset of all possible types of yogurts that are available from manufactures of yogurt. Similarly, other types of assortments are selected and created for other types of products/categories (e.g., tea assortment, milk assortment, beer assortment, meat assortment, etc.). In one embodiment, each type of assortment is generated and maintained in an electronic data structure. Each assortment data structure includes at least data identifying the items selected for the assortment (e.g., the selected types of yogurts from the all possible types of yogurts).

In one embodiment, a computer application includes instructions configured to analyze items that are presently part of the assortment and candidate items that are available to add to the assortment according to a demand transference function. The demand transference function determines, for example, possible effects (e.g., forecasted changes) on sales of the assortment by modifying which items are in the assortment. Possible effects on sales are determined for each modification such as by removing each item within the assortment, and by adding new candidate items to the assortment. New items may be selected from a stored list/set of available items from the relevant assortment type (e.g., from a list of possible yogurt types, a list of possible meat types, etc.). The demand transference function accounts for effects on the assortment as a whole when an item is removed and/or added. That is, the demand transference function assesses a difference between total sales units, revenue, or gross profits of the assortment with or without a particular item.

Accordingly, in one embodiment, items in the assortment are correlated with the available items to identify which items to swap. For example, items with a demand transference value that indicates a smallest decrease when removed are paired with items that have a largest increase when added. By correlating items between the assortment and a set of available items, in this manner, pairs of items that, if swapped, improve the assortment are identified. Thus, items are selected for the assortment while accounting for effects of adding and removing items in relation to the assortment as a whole. In this way, shifts in sales from one item to another can be better forecasted to guide selecting items for the assortment.

Figure 1:
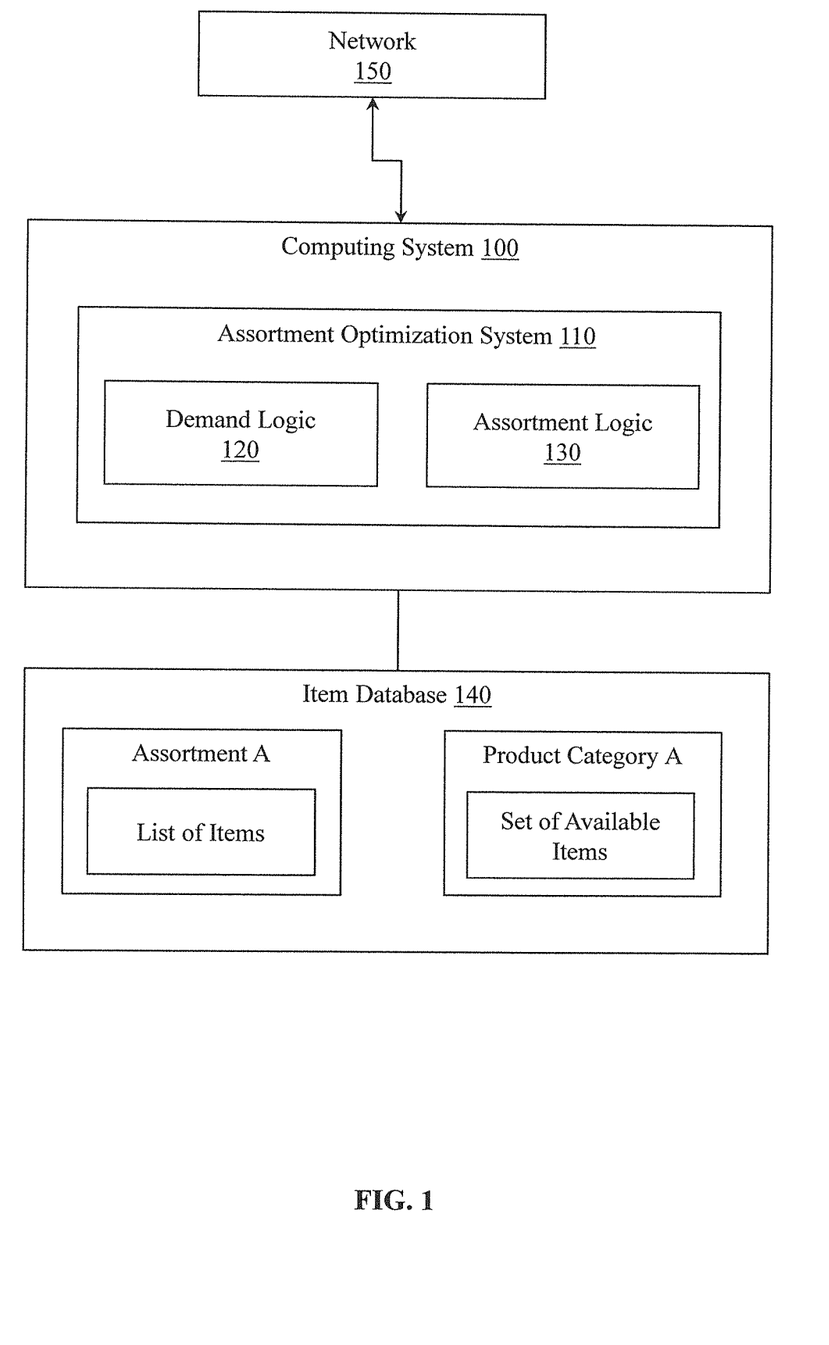
FIG. 1 illustrates one embodiment of a system associated with incrementally swapping items in an assortment according to demand transference values.

With reference to FIG. 1, one embodiment of a computing system 100 associated with analyzing, modifying, and selecting items for an assortment is illustrated. The computing system 100 includes an assortment optimization system 110 configured as an executable application that includes at least demand logic 120 and assortment logic 130. The demand logic 120 and the assortment logic 130 are, for example, modules stored in a non-transitory memory. In one embodiment, the demand logic 120 is configured to generate demand transference values for items from item data stored in an item database 140. Additionally, the assortment logic 130 is configured to, for example, use the demand transference values to identify pairs of items to swap and select items for the assortment.

In general, the computing system 100 is a computer system that includes at least a processor, memory, and network interface, and includes the assortment optimization system 110 that is configured to communicate over a communication network 150. In one embodiment, the computing system 100 receives, reads, accesses, and/or parses an electronic data structure that defines an assortment that is to be optimized. As will be discussed in further detail subsequently, the assortment is, in one embodiment, an initial assortment of items that are currently on sale by a retailer.

In one embodiment, details about the assortment are electronically communicated to the assortment optimization system 110. That is, stock keeping units (SKUs) (e.g., serial number identifiers) or other identifiers of items are electronically provided to the computing system 100. While a simple identifier is discussed as being provided to the computing system 100, of course, in other embodiments, additional information may also be provided. In one embodiment, the electronic data structure includes a record for each item that may include a product identifier, sales data, profit margins, product dimensions and characteristics and so on. The electronic data structure may also include information about the assortment as a whole, e.g., total category sales and so on.

Furthermore, identifying information provided to the computing system 100 about items may be used to reference further information about items stored in the item database 140. In general, item information is stored in data structures such as data records, data tables, files, etc. for each item in the item database 140. In one embodiment, the computing system 100 also obtains information regarding a set of available items. The set of available items are items not presently in the assortment but are items available to add to the assortment.

In one embodiment, the item database 140 includes an electronic data structure that defines an assortment A with a list of items that are presently part of the assortment provided by the retailer. The item database 140 may also include a separate electronic data structure that defines a product category A with a set of available items that are candidate items to swap into the assortment A. In general, the electronic data structures define various attributes (e.g., identifiers, sales data) and other information about items and the assortment (e.g., sales data). Of course, while a single assortment and product category (e.g., yogurt) are illustrated in FIG. 1, the item database 140 may include individual assortments and sets of available of items for each product category (e.g., beer, meat, cheese, etc.) associated with a retailer.

Along with receiving the identity information of items, the computing system 100 receives, in one embodiment, configuration parameters that define options for optimizing the assortment. The configuration parameters specify, for example, a selected metric value about the assortment to optimize, a list of required items, a final assortment size, a fraction of initial items to keep (fraction-to-keep), a target value to meet for the assortment and so on. The various configuration parameters influence how selection of items in the assortment proceeds.

For example, the selected metric value indicates an attribute of the assortment by which the assortment is optimized. That is, items are selected/swapped in the assortment to optimize the selected metric value. In one embodiment, the selected metric value is selected from values that include a total number of sold units for the assortment, a revenue for the assortment, gross profits for the assortment or some other attribute by which the assortment as a whole can be measured. Thus, for example, the assortment optimization system 110 may optimize the assortment to maximize total units sold or profits.

The other configuration parameters generally influence how the assortment is optimized according to the selected metric value. For example, the list of required items is a list of items that must be present in the final assortment. The items may be initially part of the assortment or specified as items that must be added. Accordingly, when swapping, items on the list of required items are automatically not considered for swapping/removal since they are required to be in the final assortment.

The fraction-to-keep indicates a percent of items from the initial assortment that are to be present in the final assortment. In this way, a retailer can optimize the assortment while ensuring some of the original items are kept in the assortment. Specifying the fraction-to-keep parameter can limit costs associated with procuring new items and, for example, liquidating current inventory when an item is removed.

The final assortment size parameter indicates how many total items are to be included in the final assortment. To accommodate the final assortment size, in one embodiment, the assortment optimization system 110 initially adds or removes items prior to swapping items in the assortment. The target to meet parameter indicates a goal for one of the metric values that is to be satisfied prior to the optimization concluding.

Figure 2:
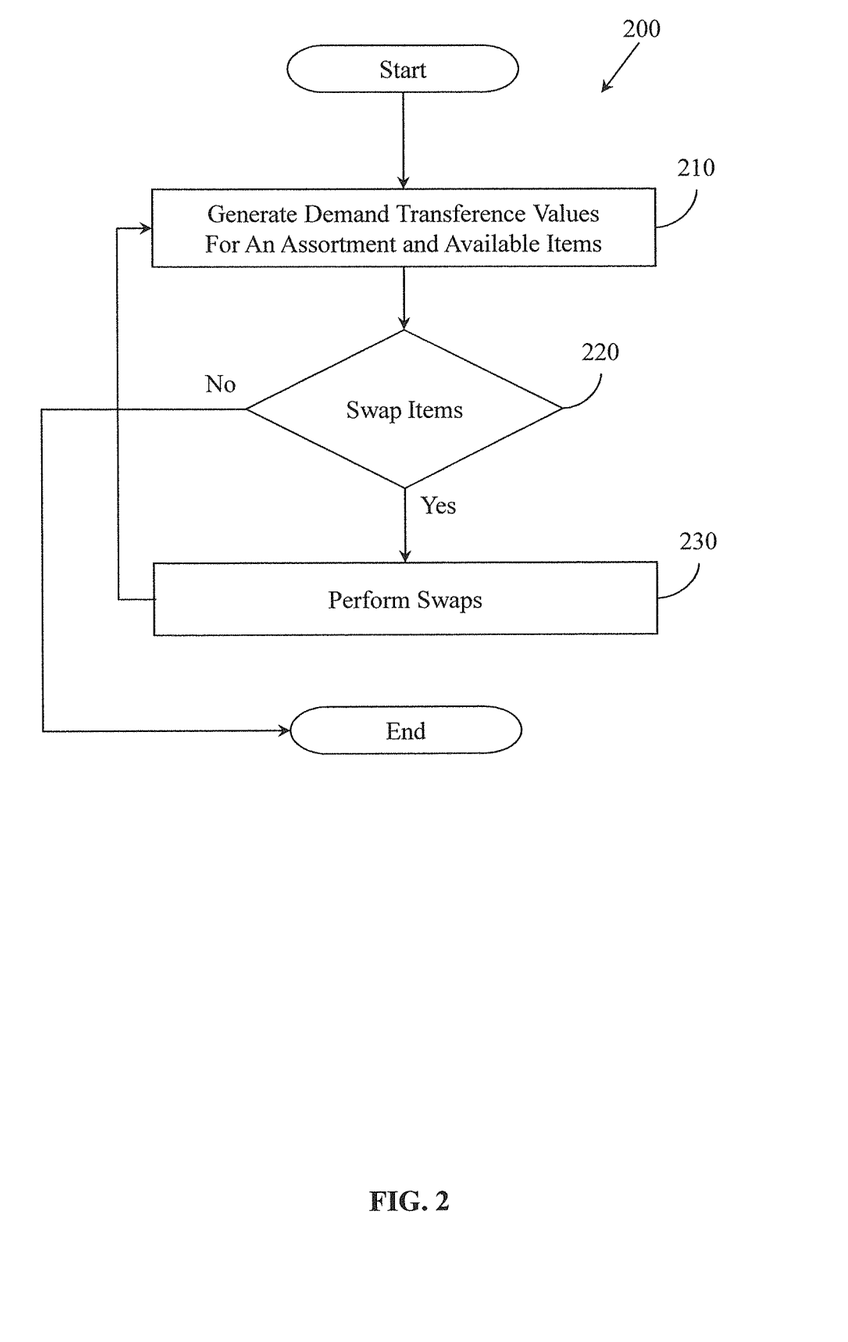
FIG. 2 illustrates one embodiment of a method associated with selectively swapping items in an assortment.

Further aspects of the assortment optimization system 110 and swapping items in an assortment will be discussed with reference to FIG. 2. FIG. 2 illustrates one embodiment of a method 200 associated with incrementally swapping items in an assortment. FIG. 2 will be discussed from the perspective of the computing system 100 of FIG. 1.

At 210, demand transference values are calculated for an assortment of items and for a set of available of items. In general, the demand transference values specify forecasted changes/contributions to a selected metric value (e.g., revenues) associated with a particular item (e.g., banana yogurt) in a product category (e.g., yogurts). Thus, demand transfer values generally quantize two different effects. The first are effects on a selected metric value of an assortment resulting from removal of an item. The second are effects on the selected metric value of an assortment resulting from adding an item.

For example, removing an item from an assortment generally means that some fraction of customers that were purchasing the item will choose to purchase different items in the assortment. Thus, a portion of the demand for the removed item transfers to the different items in the assortment. However, a remaining portion of the demand for the removed item may be lost and not transferred to the different items in the assortment. That is, some portion of the customers will purchase no replacement item in place of the removed item. Thus, removing the item effects the selected metric value (e.g., revenues) to some degree by shifting demand from the removed item to remaining items and/or losing/gaining sales. This total effect on the selected metric value is the transfer in demand, or, demand transference value for removing the particular item.

Conversely, when adding items to the assortment similar transfers in demand from existing items in the assortment to new items occurs. Consequently, adding a new item may result in a shift of sales from existing items to the new item. Adding a new item may also bring in new, additional sales. The total effect of this shift and addition is the transfer in demand or the demand transference value for adding the particular item.

Thus, the demand logic 120 produces two separate sets of demand transference values. A first set of values are addition demand transference values and a second set of values are removal demand transference values. The separate sets of values relate to whether an item is to be added to or removed from the assortment and are forecasted changes in a selected metric value associated with that change. That is, if an item is present in the assortment, the item is treated as though it would be removed. By contrast, if an item is not in the assortment, then the item is treated as though it is being added when generating an associated demand transference value.

As already indicated, the demand transference values are generated in relation to the selected metric value for the assortment. That is, the demand logic 120 computes the demand transference values as a function of the selected metric value. For example, if the selected metric value specifies revenue for the assortment, then each of the demand transference values indicates a change/shift in the revenue for the assortment in relation to adding or removing a particular item.

Consider an example where the selected metric value is total revenue for the assortment. In this example, the demand logic 120 generates the transference values as a positive or negative change in the revenue when either adding or removing a particular item to the assortment. The demand logic 120 generates each demand transference value independently to account for changes in demand when adding/removing an item in relation to the assortment.

However, to maintain efficiency of processing time to generate the demand transference values, each value is determined in isolation. That is, adjustments are accounted for in relation to the individual item assuming that only that one item is added/removed from the assortment. In one embodiment, applying the demand transference function in this way includes calculating a value for a particular item while assuming the rest of the assortment remains the same.

For example, the demand logic 120 applies the demand transference function to an item in isolation by computing demand transference effects between the item in question and all other items in the assortment. However, the demand logic 120 performs this computation by assuming that all other items in the assortment remain in the assortment without any removals that would occur from a swap. In this way, affects of adding/removing an item on the assortment are included within the provided demand transference values without performing intensive calculations over combinations of items to be removed/added.

Accordingly, as a result of 210, two sets of demand transference values are produced. The first set is a set of addition demand transference values that identify changes in the selected metric value in relation to individually adding each item from the set of available items. The addition demand transference values indicate by what extent the selected metric value changes if an item was added to the assortment without removing any items (i.e., a plain addition with no swap).

The second set of values is a set of removal demand transference values that identify changes in the selected metric value in relation to individually removing each item from the assortment. The removal demand transference values indicate to what extent the selected metric value of the whole assortment (e.g., revenue) changes if an item is removed from the assortment without adding any items to replace the removed item. In this way, the demand transference values provide a general indicator of an effect of adding or removing particular items without undertaking an intensive processing of multiple item combinations over the whole assortment.

At 220, a decision of whether to swap items according to the demand transference values is undertaken. In one embodiment, the assortment logic 130 is configured to correlate items from the assortment with items in the set of available items according to the demand transference values from 210. This correlating generates pairs of items, one from the assortment and one from the available set that can then be tested for conditions of a viable swap.

In one embodiment, the assortment logic 130 pairs items according to relative magnitudes of the demand transference values. That is, items with values that would likely generate a beneficial swap are paired together. In general, the pairing includes an item in the assortment with a value that would least influence the selected metric value with an item from the set of available items that would most influence the selected metric value.

Consider an example where the items are various types of yogurts. Further consider that an item with the least influence on the selected metric value is grape yogurt with a decrease in sales of units of 12 if removed, while a corresponding item from the set of available items is banana yogurt with an increase of 200 units if added.

Accordingly, the assortment logic 130 is configured to compare the values at 220 to determine whether, for example, the swap is beneficial. If the swap is beneficial, e.g., improves revenue for the assortment, then at 230 the items are swapped. That is, the grape yogurt is removed from the assortment while the banana yogurt is added to the assortment since the difference between the associated demand transference values indicates a positive change to the selected metric value.

In general, the assortment logic 130 swaps items in this manner until there are no more swaps that improve the selected metric value. That is, the assortment logic 130 incrementally proceeds through correlated pairs by swapping pairs that benefit the selected metric value. In one embodiment, the assortment optimization system 110 iteratively repeats the method 200 performing the demand transference value computations and swapping for each updated assortment until no beneficial swaps remain. In this way, a state of the assortment is incrementally altered to optimize the assortment in relation to the selected metric value.

Figure 3:
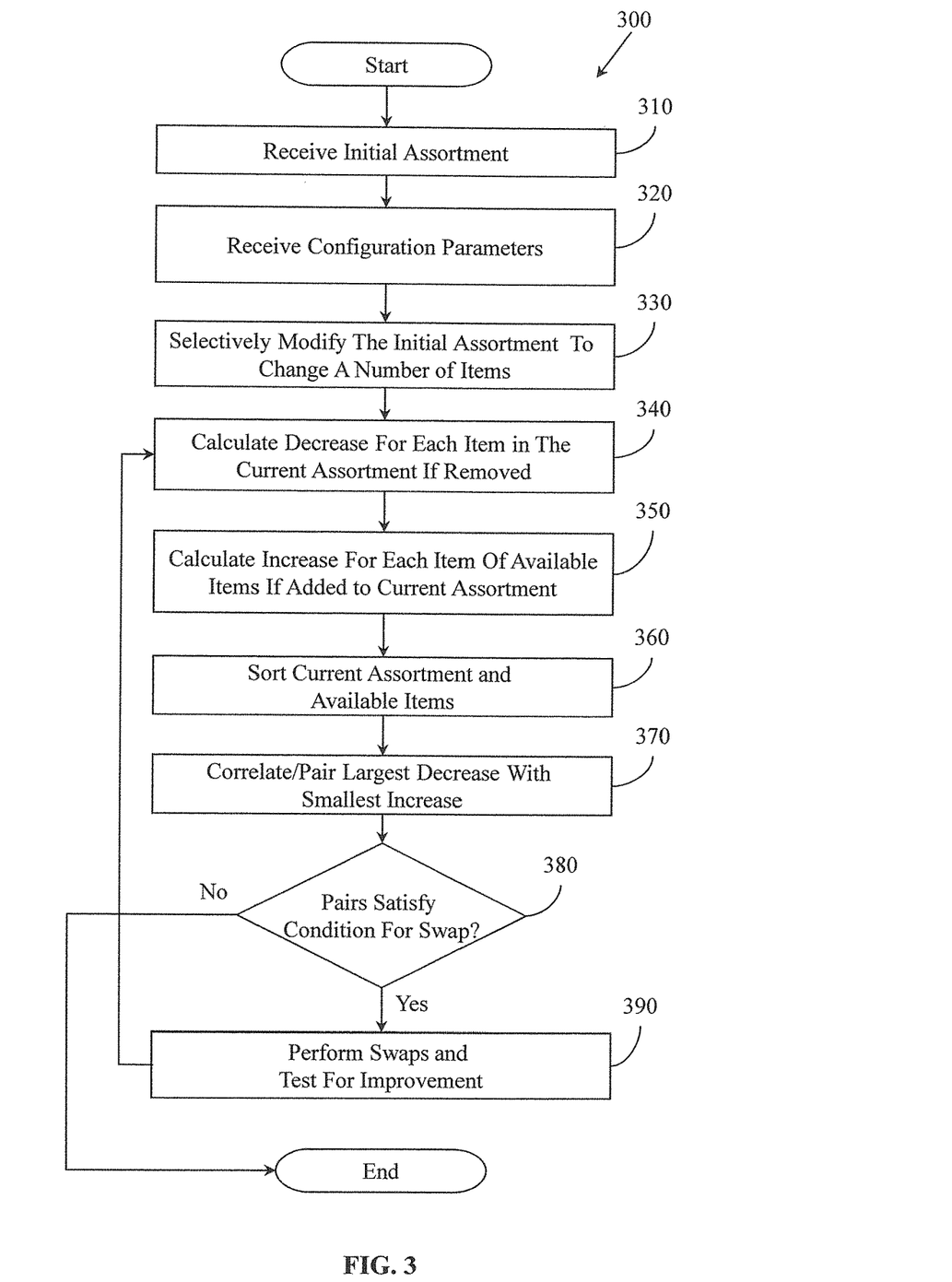
FIG. 3 illustrates one embodiment of a method associated with modifying an assortment by selectively swapping items according to demand transference values.

Further discussion of incrementally swapping items from an assortment will be discussed in relation to FIG. 3. FIG. 3 illustrates one embodiment of a method 300 associated with incrementally swapping items in an assortment.

At 310, an initial assortment is received. In one embodiment, receiving the initial assortment occurs by way of an electronic communication over an electronic communication network. The communication identifies items in the initial assortment or may include an electronic data structure that identifies information about each item and the assortment as a whole. As already discussed, the initial assortment is a group of items in a category of a retail inventory. In general, the initial assortment may already be provided in a retail store as items for purchase. Alternatively, the initial assortment is a proposed assortment that has not yet been implemented in a retail store.

At 320, configuration parameters are received. In one embodiment, the configuration parameters control how items are selectively added/swapped in the initial assortment. As previously described, the configuration parameters include a selected metric value (e.g., revenue, total sales, etc.) for the assortment along with additional optional parameters, such as, a final assortment size, a fraction to keep (fraction-to-keep), a target to meet and so on.

At 330, a total number of items in the assortment is selectively modified. In one embodiment, the assortment is initially transformed to include a total number of items as specified in the configuration parameters for the final assortment. That is, if the configuration parameters specify a total number of items for the assortment that differs from how many items are present in the initial assortment, then the assortment is modified to conform with the specified number prior to proceeding.

In one embodiment, the assortment is selectively modified in an intelligent manner by adding or removing items according to how best to affect the selected metric value. That is, items are not blindly added or removed. Rather, in one embodiment, items are added or removed according to associated demand transference values. Accordingly, at 330, demand transference values are computed for items in the assortment or the available set of items depending on whether items are to be added or removed.

Thereafter, items are either added or removed until the specified total number is satisfied. In general, the items are added in order according to which item most improves the selected metric value to an item that least improves the selected metric value. Similarly, items are removed in order according to which item least influences the selected metric value. In this way, selectively modifying the assortment occurs in relation to the selected metric value to provide for optimizing the assortment while satisfying the specified total number.

At 340, demand transference values are calculated for items presently in the assortment. In general, the demand transference values provide an indicator of a prospective change in the selected metric value for individually removing each item in the assortment. In one embodiment, demand transference values are computed by assessing an effect of removing each item in isolation from the assortment using a demand transference function. That is, a value is computed for each item as though the item is removed from the assortment. Thus, each item in the assortment has a demand transference value associated with removing that particular item. A resulting demand transference value indicates a value for the selected metric value (e.g., revenue) that would be expected for the assortment without the particular item.

Furthermore, the demand transference function is altered to efficiently produce the demand transference values. In general, the efficiency relies on the use of "assortment elasticity," which allows efficient and exact calculation of the effect of removal of an Item A on any remaining Item N left in the assortment, provided that certain intermediate results are maintained and updated during execution of method 300. Assortment elasticity translates changes in these intermediate results into effects on any remaining item N. Thus determining effects on an item N includes determining the changes in the intermediate results rather than a wholesale re-calculation over the entire assortment.

The intermediate values are values from, for example, a previous iteration of the demand transference function for a previous assortment. Thus, each subsequent iteration for a different assortment updates the previous intermediate results to execute more efficiently without re-calculating results for all items from scratch. This demand transference function with assortment elasticity provides flexibility in producing the demand transference values by providing an accurate approximation of the demand transference values using the accumulated intermediate results.

In one embodiment, applying the demand transference function to the an item A in isolation includes determining an effect of removing that particular item in relation to each other item N in the assortment. For a given item N, it is possible to calculate the effect of A on N without involving calculations on the items other than A and N if certain intermediate results are maintained and updated during execution of method 300. This is, for example, an exact calculation, and much more efficient than if calculating the effect of A on N required also referring to all the other items in the assortment. The use of assortment elasticity makes it possible for these intermediate results to be a sufficient basis for the exact calculation without reference to every other item in the assortment.

At 350, demand transference values for the set of available items are calculated. Values, at 350, are, for example, calculated in a similar manner as values, at 340. In one embodiment, at 350, the demand transference function is applied individually to each item as though a particular item is being added to the assortment without removing a respective item from the assortment. As a result, each item in the set of available items has an associated value that is computed as though that item is individually and incrementally added to the assortment.

Thus, calculating the demand transference values for the set of available items applies the demand transference function to each item in isolation. The calculation of each demand transference value does not, for example, require referring to all of the items in the assortment if assortment elasticity is applied to certain intermediate results that are maintained and updated during execution of method 300. Applying the function in this way improves processing speed when calculating many values while still providing accurate demand transference values.

At 360, the items in the assortment and the set of available items are sorted according to the values from 340 and 350. In one embodiment, the items in the assortment are sorted in ascending order according to a magnitude of the demand transference values associated with individually removing items (i.e., smallest to largest). By contrast, the set of available items are sorted, for example, in descending order according to a magnitude of demand transference values associated with individually adding items (i.e., largest to smallest). While specific forms of sorting are discussed, it should be appreciated that other options are available for identifying which items have demand transference values with parameters that are applicable to the method 300.

At 370, items from the assortment and items from the set of available items are correlated/paired together according to the sorting from 360. That is, an item from the set of available items with a largest demand transference value is paired with an item from the assortment with a smallest demand transference value and so on. Pairing the items according to the sorted values identifies beneficial swaps quickly to focus which items should potentially be swapped.

Additionally, at 380, the pairs are compared against a threshold to determine whether to end or to proceed with the swaps at 390. In one embodiment, at 380, the pairs are analyzed to determine whether any improving swaps are present. For example, if demand transference values for a first pair (i.e., a pair with a largest difference between demand transference values) do not satisfy a predefined threshold (e.g., greater than 5% difference), then the swaps will not proceed and the method 300 ends.

Failing to satisfy the predefined threshold indicates that the assortment is optimized and swapping does not need to occur since swapping will not, for example, substantially improve the selected metric value. Thus, the assortment then satisfies the predefined condition according to the selected metric value. Of course, as the process of swapping is iterative from 340-390, swapping items between the assortment and the set of available items generally occurs multiple times before the predefined threshold for exiting the method 300 is met.

In one embodiment, if the predefined threshold is satisfied for at least the first pair, then swapping will occur. Accordingly, at 390, pairs of items are swapped and individually tested to ensure each swap is actually beneficial. In one embodiment, the pairs that are swapped are limited to a specified maximum number (e.g., 10) for each iteration. In this way, only the most beneficial swaps are executed.

Accordingly, each swap incrementally transforms a state of the assortment by exchanging an existing item in the assortment for a new item from the set of available items. Thus, each swap moves an item from the set of available items into the assortment while moving a correlating item from the assortment to the set of available items. Furthermore, as this incremental swapping occurs, each progressive swap is qualified to ensure that the swap actually improves the selected metric value.

To qualify a swap, an additional demand transference value is generated for the updated assortment with the newly exchanged item. That is, a demand transference value is computed for the assortment with the new item and without the removed item. For efficiency, the calculation of this demand transference value proceeds according to the same scheme detailed in relation to 340 and 350. In general, the added item and the removed item cause changes in the intermediate values, and then assortment elasticity is applied to these changed intermediate values to give the demand transference value, which includes effects of both adding and removing items noted in the swap. Thus, when qualifying a swap the demand transference value is not, for example, determined in isolation as done at 340 and 350.

For example, individual demand transference values, as determined from 340, are used to assess the exchange of the new item. In one embodiment, a change in the demand transference values for each item in the assortment is determined according to an effect of adding the exchanged item and removing the removed item. Subsequently, the updated demand transference values are summed. If the sum of the updated demand transference values for the whole assortment is negative then the swap is rejected. That is, the item is removed and the previous item is replaced.

However, if the sum is positive then the swap is accepted and the updated demand transference values are, for example, saved for a subsequent qualification (these are the intermediate results referred to at 340 and 350). In this way, the demand transference function is applied over the whole assortment to provide a demand transference value that accurately indicates whether swapping the items improves the selected metric value. Of course, while a single swap and qualification is discussed, swapping occurs for a maximum number of items for each iteration of 390 as defined by the configuration parameters.

Subsequently, the process repeats by returning to 340 where demand transference values are again calculated. Blocks 340 through 390 iteratively repeat until the condition for exiting is satisfied at 380. A resulting assortment includes items that optimize the selected metric value according to the configuration parameters. In one embodiment, after the assortment is optimized, the optimized assortment is provided to a retail manager or other individual that may modify a physical inventory at an actual retail location according to the optimized assortment provided by method 300.

Figure 4:
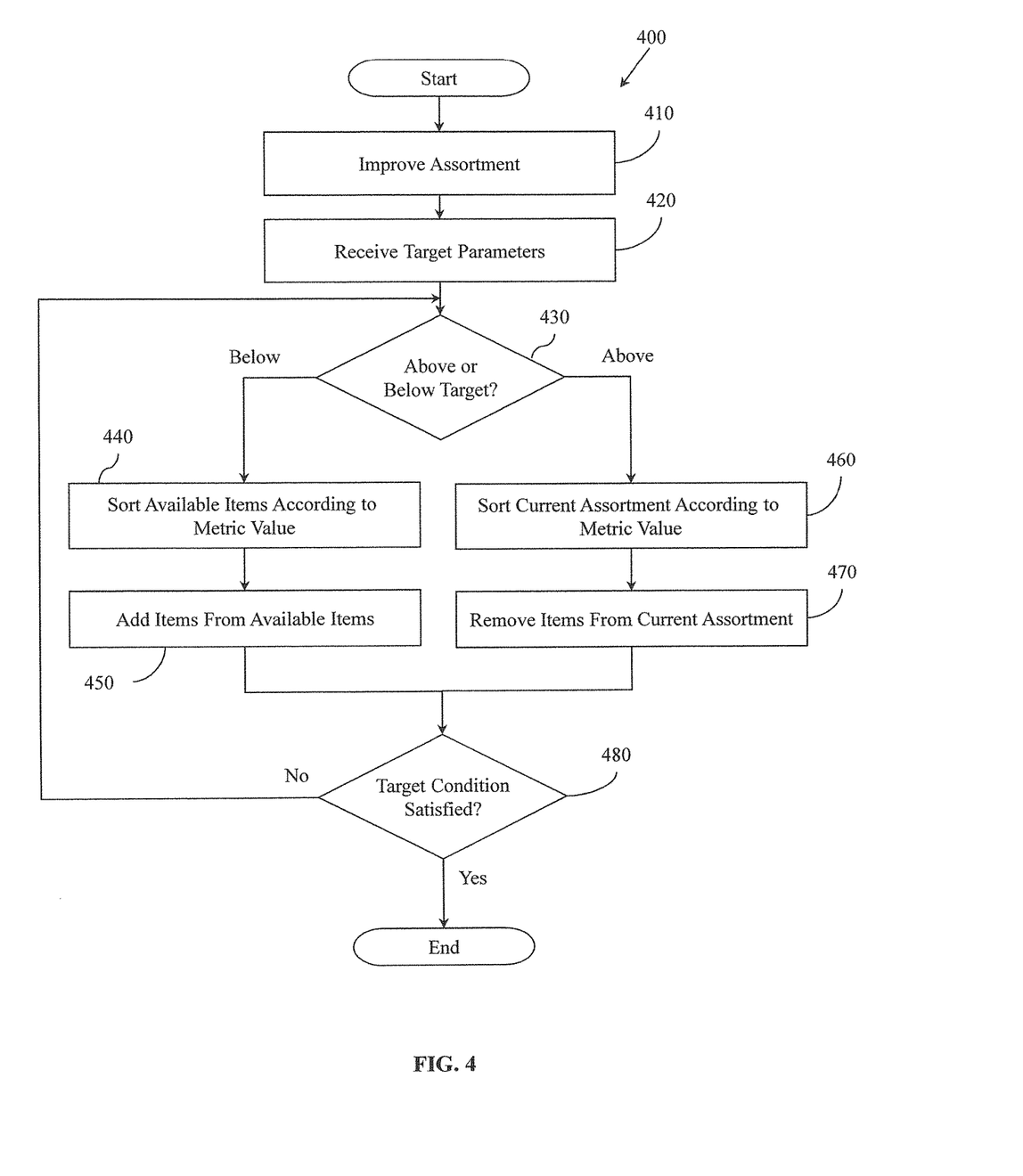
FIG. 4 illustrates one embodiment of a method associated with altering an assortment to meet a predefined target.

Further selective optimizations of the assortment will be discussed in reference to FIG. 4. FIG. 4 illustrates one embodiment of a method 400 associated with meeting a predefined target for an assortment.

At 410, the method 400 includes executing the method 300 of FIG. 3. That is, for example, an initial assortment that is altered according to method 400 has already been optimized according to a first metric value (e.g., revenues) within a particular assortment size using method 300. Thus, method 400 further alters the assortment by adding or deleting items to cause the assortment to meet a specific target.

In one embodiment, the target is received at 420 of method 400 or, alternatively, at 320 of method 300 along with the configuration parameters. The target is a specific quantity for a second metric value to meet. The second metric value is, for example, revenue for the assortment, profit for the assortment, total sales for the assortment, and so on.

At 430, the second metric value is compared to the target. Two separate courses are possible as a result of the comparison. The first course that includes blocks 440 and 450 adds items to the assortment while the second course that includes blocks 460 and 470 removes items from the assortment. The first course is selected and executed when the second metric value is below the target and the second course is selected and executed when the second metric value is above the target.

Thus, if the selected metric value is below the target, then, at 440, available items are sorted/ranked in descending order according to demand transference values for individually adding items from the set of available items to the assortment (e.g., largest increase to smallest increase). Alternatively, at 460, items from the assortment are sorted/ranked in ascending order (e.g., smallest decrease to largest decrease) according to demand transference values for individually removing items from the assortment. Sorting the items according to demand transference values identifies which items are most beneficial to add or remove. In this way, each addition or deletion of an item is focused to optimize the second metric value.

Furthermore, consider that meeting the target can occur in several different ways. One way is to blindly add or remove until the target is met. However, this approach would likely result in an assortment with more items than necessary and may also undo the previous optimizations from method 300. Having more items than necessary in the assortment to meet the target is inefficient since each item has an associated logistical cost for procuring, storing, and so on.

Thus, the method 400 is directed to satisfying the target using a minimum number of items within the assortment. Accordingly, sorting the items at 440 and 460 provides a means to identify which items most efficiently support meeting the target with a minimum number of items. Thus, items can be added at 450 or removed at 470 with knowledge of how adding/removing the item will the change the second metric value for the assortment Accordingly, at 450, if the second metric value is below the target, then items are added until the second metric value exceeds the target. That is, items are added one at a time from the set of available items to the assortment until the target is satisfied for the assortment as a whole.

Alternatively, at 470, if the second metric value is above the target, then items are removed from the assortment until the second metric value falls below the target. Thus, items are removed one at a time from the assortment until the second metric value for the assortment falls below the target.

It should be noted that determining a value of the second metric value generally includes summing demand transference values for all items in the assortment after an item has been added at 450 or removed at 470 to determine whether the second metric value is above or below the predefined target. (This is the same calculation as detailed in 0056 and 0057.)

Once the second metric value exceeds the predefined target, at 450, or falls below the second metric value at 470 from iteratively modifying which items are in the assortment, a target condition is checked at 480.

At 480, the target condition is tested. In one embodiment, the target condition for exiting the method 400 is whether an item count is continuing to decrease through successive iterations of 430-470. If, after a predefined number of iterations (e.g., three), the total number of items in the assortment does not continue to decrease or is oscillating back and forth around a mean total number of items, then the method 400 exits.

Exiting the method 400 means that the target for the second metric value has been sufficiently satisfied and the total number of items in the assortment is substantially close to a minimum possible number of items for meeting the target. In this way, the assortment can be further optimized to meet a target value.

Computer Embodiment

Figure 5:
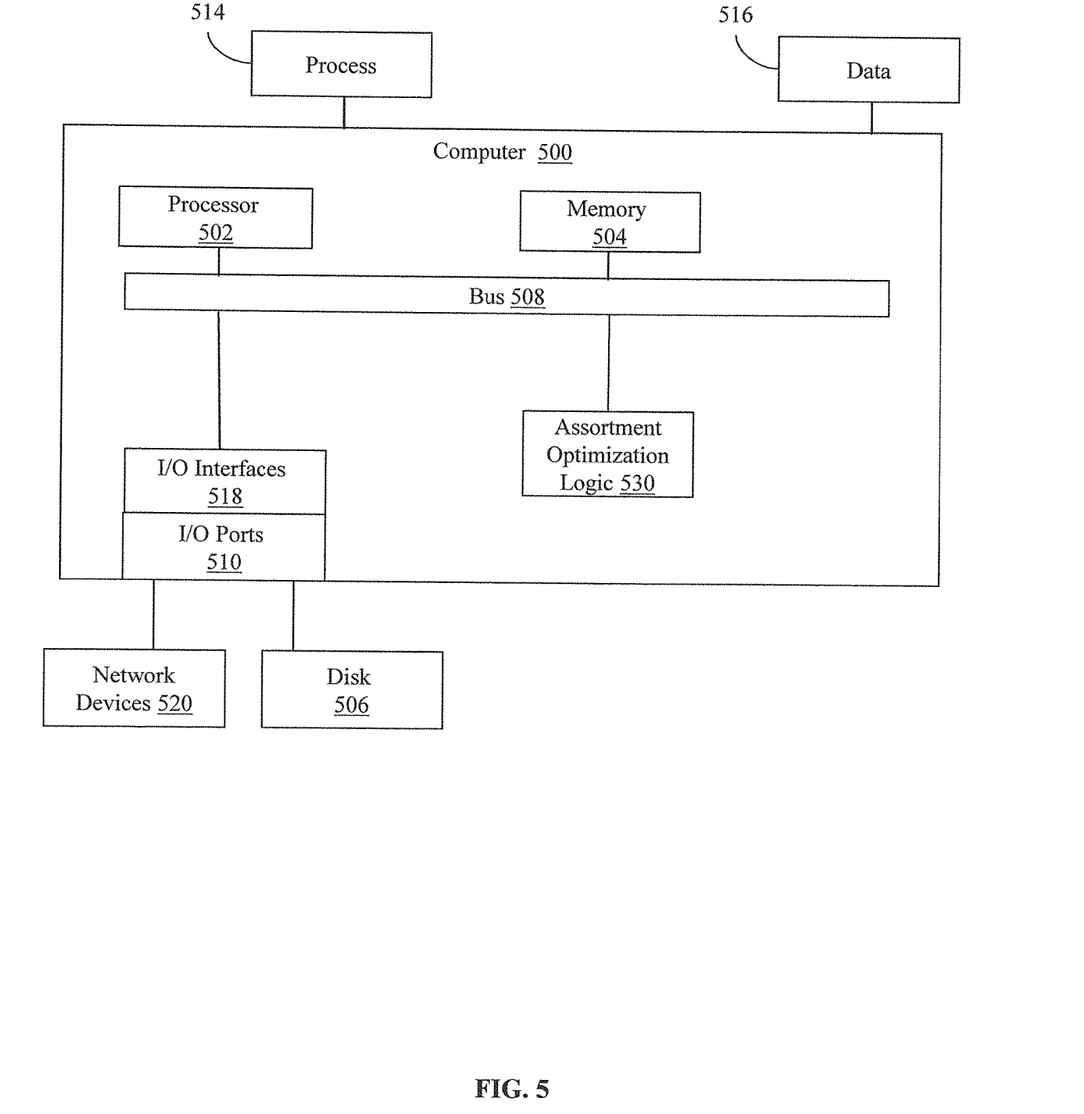
FIG. 5 illustrates an embodiment of a computing system configured with the example systems and/or methods disclosed.

FIG. 5 illustrates an example computing device that is configured and/or programmed with one or more of the example systems and methods described herein, and/or equivalents. The example computing device may be a computer 500 that includes a processor 502, a memory 504, and input/output ports 510 operably connected by a bus 508. In one example, the computer 500 may include assortment optimization logic 530 configured to facilitate optimizing items in an assortment by incrementally swapping items into the assortment according to demand transference values similar to the assortment optimization system 110 shown in FIG. 1. In different examples, the logic 530 may be implemented in hardware, as modules stored in a memory, as a non-transitory computer-readable medium with stored instructions, firmware, and/or combinations thereof. While the logic 530 is illustrated as a hardware component attached to the bus 508, it is to be appreciated that in one example, the logic 530 could be implemented in the processor 502.

In one embodiment, logic 530 or the computer is a means (e.g., hardware, non-transitory computer-readable medium, firmware) for generating demand transference values and incrementally swapping items in an assortment.

The means may be implemented, for example, as an ASIC programmed to generate correlation coefficients and analyze the coefficients to identify the mismappings. The means may also be implemented as stored computer executable instructions that are presented to computer 500 as data 516 that are temporarily stored in memory 504 and then executed by processor 502.

Logic 530 may also provide means (e.g., hardware, non-transitory computer-readable medium that stores executable instructions, firmware) for altering the assortment to meet a target value.

Generally describing an example configuration of the computer 500, the processor 502 may be a variety of various processors including dual microprocessor and other multi-processor architectures. A memory 504 may include volatile memory and/or non-volatile memory. Non-volatile memory may include, for example, ROM, PROM, and so on. Volatile memory may include, for example, RAM, SRAM, DRAM, and so on.

A storage disk 506 may be operably connected to the computer 500 via, for example, an input/output interface (e.g., card, device) 518 and an input/output port 510. The disk 506 may be, for example, a magnetic disk drive, a solid state disk drive, a floppy disk drive, a tape drive, a Zip drive, a flash memory card, a memory stick, and so on. Furthermore, the disk 506 may be a CD-ROM drive, a CD-R drive, a CD-RW drive, a DVD ROM, and so on. The memory 504 can store a process 514 and/or a data 516, for example. The disk 506 and/or the memory 504 can store an operating system that controls and allocates resources of the computer 500.

The computer 500 may interact with input/output devices via the i/o interfaces 518 and the input/output ports 510. Input/output devices may be, for example, a keyboard, a microphone, a pointing and selection device, cameras, video cards, displays, the disk 506, the network devices 520, and so on. The input/output ports 510 may include, for example, serial ports, parallel ports, and USB ports.

The computer 500 can operate in a network environment and thus may be connected to the network devices 520 via the i/o interfaces 518, and/or the i/o ports 510. Through the network devices 520, the computer 500 may interact with a network. Through the network, the computer 500 may be logically connected to remote computers. Networks with which the computer 500 may interact include, but are not limited to, a LAN, a WAN, and other networks.

Definitions and Other Embodiments

In another embodiment, the described methods and/or their equivalents may be implemented with computer executable instructions. Thus, in one embodiment, a non-transitory computer storage medium is configured with stored computer executable instructions that when executed by a machine (e.g., processor, computer, and so on) cause the machine (and/or associated components) to perform the method.

While for purposes of simplicity of explanation, the illustrated methodologies in the figures are shown and described as a series of blocks, it is to be appreciated that the methodologies are not limited by the order of the blocks, as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional actions that are not illustrated in blocks. The methods described herein are limited to statutory subject matter under 35 U.S.C. § 101.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Computer communication", as used herein, refers to a communication between computing devices (e.g., computer, personal digital assistant, cellular telephone) and can be, for example, a network transfer, a file transfer, an applet transfer, an email, an HTTP transfer, and so on. A computer communication can occur across, for example, a wireless system (e.g., IEEE 802.11), an Ethernet system (e.g., IEEE 802.3), a token ring system (e.g., IEEE 802.5), a LAN, a WAN, a point-to-point system, a circuit switching system, a packet switching system, and so on.

"Computer-readable medium", as used herein, refers to a non-transitory medium that stores instructions and/or data configured to perform one or more of the disclosed functions when executed. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, and other media from which a computer, a processor or other electronic device can function with. Each type of media, if selected for implementation in one embodiment, includes stored instructions of an algorithm configured to perform one or more of the disclosed and/or claimed functions.

"Logic", as used herein, includes a component that is implemented in computer or electrical hardware, firmware, a non-transitory medium with stored instructions of an executable algorithm/application, a module stored in a non-transitory memory and/or combinations of these to perform any of the functions or actions as disclosed herein, and/or to cause a function or action from another logic, method, and/or system to be performed as disclosed herein. Logic may include a microprocessor programmed with an algorithm, a discrete logic (e.g., ASIC), at least one circuit, an analog circuit, a digital circuit, a programmed logic device, a memory device containing instructions of an algorithm, and so on, all of which are configured to perform one or more of the disclosed functions. Logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on desired system conditions or specifications. Logic is limited to statutory subject matter under 35 U.S.C. § 101.

An "operable connection," or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, non-transitory computer-readable medium). Logical and/or physical communication channels can be used to create an operable connection.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the disclosure is not limited to the specific details, the representative apparatus, and illustrative examples shown and described. Thus, this disclosure is intended to embrace alterations, modifications, and variations that fall within the scope of the appended claims, which satisfy the statutory subject matter requirements of 35 U.S.C. § 101.

To the extent that the term "includes" or "including" is employed in the detailed description or the claims, it is intended to be inclusive in a manner similar to the term "comprising" as that term is interpreted when employed as a transitional word in a claim.

What is claimed is:

1. A method implemented by a computing device, the method comprising:

reading data from an electronic data structure that defines a current assortment, wherein the current assortment defines a number of items from a product category that are part of a retail inventory, and wherein the current assortment as a whole has an associated metric value;

calculating a set of removal demand transference values for the items in the current assortment, wherein for each item in the assortment, applying a demand transference function to the item in isolation to generate a removal demand transference value for the item that represents a change in the associated metric value caused by individually removing the item from the current assortment;

storing the set of removal demand transference values as intermediate results of the current assortment in a data structure;

reading a set of available items that include items from the product category that not item included in the current assortment;

calculating a set of addition demand transference values for the items in the set of available items, wherein for each available item in the set of available items, applying the demand transference function to the available item in isolation to generate an addition demand transference value for the available item that represents a change in the associated metric value of the assortment caused by individually adding the available item to the current assortment;

defining item pairs for swapping that include one item from the current assortment and one item from the available items based at least in part on associated demand transference values;

transforming the electronic data structure that defines the current assortment by iteratively swapping one or more of the item pairs, wherein each swap creates an updated assortment, and the current assortment becomes a previous assortment in a next iteration;

wherein each iteration includes:
  qualifying a swapped item pair by:
    removing the one item from the current assortment and adding the one item from the available items to create the updated assortment;
    updating the intermediate results of the previous assortment using updated demand transference values generated from the swapped item pair;
    wherein each iteration updates the intermediate results of the previous assortment to execute more efficiently without recalculating results for all items of the updated assortment;

applying assortment elasticity to the updated intermediate results to produce new demand transference values that include effects of swapping the swapped item pair as applied over the whole updated assortment;

in response to the new demand transference values for the updated assortment indicating a positive change to the associated metric value, (i) accepting the swap, and (ii) storing the updated intermediate results in the data structure for the next iteration of iteratively swapping, wherein the updated assortment is assigned as the current assortment in the next iteration;

upon completion of the iteratively swapping, storing the updated assortment in the electronic data structure as an optimized assortment; and transmitting the electronic data structure that defines the optimized assortment to a remote computing device to cause a physical inventory of corresponding items to be modified and swapped according to the electronic data structure that defines the optimized assortment.

2. The method of claim 1, wherein defining the item pairs for swapping includes:
sorting the items in the current assortment based at least in part on the removal demand transference values associated with the items;
sorting the available items in the set of available items based at least in part on the addition demand transference values associated with the available items; and
defining the item pairs for swapping that include one item from the current assortment and one item from the available items based at least in part on the sorting.

3. The method of claim 1, further comprising:
for a given item pair from the one or more item pairs, comparing a difference between associated demand transference values to a threshold; and
when the difference does not satisfy the threshold, then the swap for the given item pair does not proceed, and a next item pair proceeds to the iteration.

4. The method of claim 1, wherein after applying the assortment elasticity:
in response to the new demand transference values for the updated assortment indicating a negative change for the associated metric value, rejecting the swap, and reversing the swapped item pair from the current assortment.

5. The method of claim 1, further comprising:
receiving the current assortment and configuration parameters that define options for improving the current assortment, wherein the configuration parameters specify the associated metric value about the current assortment to improve, a list of required items, a final assortment size, a fraction-to-keep, and a target to meet.

6. The method of claim 1, further comprising:
altering, after the transforming, the updated assortment to satisfy a predefined target, wherein the predefined target specifies a target value for a secondary metric value, and
wherein altering the updated assortment includes modifying a total number of items in the updated assortment until the predefined target is satisfied by iteratively adding and removing items in the updated assortment to meet the target value for the secondary metric value, wherein the predefined target is satisfied when the assortment is refined to a minimum number of items that satisfy the predefined target.

7. The method of claim 6,
wherein altering the updated assortment includes determining whether a value of the secondary metric is above or below the predefined target,
wherein items are incrementally added to the updated assortment until the predefined target is satisfied when the value is below the predefined target,
wherein items are incrementally removed from the updated assortment until the predefined target is satisfied when the value is above the predefined target, and
wherein items are added and removed according to associated demand transference values.

8. A computing system, comprising:
at least one processor electrically connected to a memory and having communication access to a storage device;
a non-transitory computer-readable medium having stored instructions for execution by the at least one processor, wherein the instructions when executed cause the at least one processor to perform:
reading data from an electronic data structure that defines a current assortment, wherein the current assortment defines a number of items from a product category that are part of a retail inventory, and wherein the current assortment as a whole has an associated metric value;
calculating a set of removal demand transference values for the items in the current assortment, wherein for each item in the assortment, applying a demand transference function to the item in isolation to generate a removal demand transference value for the item that represents a change in the associated metric value caused by individually removing the item from the current assortment;
storing the set of removal demand transference values as intermediate results of the current assortment in a data structure;
reading a set of available items that include items from the product category that not item included in the current assortment;
calculating a set of addition demand transference values for the items in the set of available items, wherein for each available item in the set of available items, applying the demand transference function to the available item in isolation to generate an addition demand transference value for the available item that represents a change in the associated metric value of the assortment caused by individually adding the available item to the current assortment;
defining item pairs for swapping that include one item from the current assortment and one item from the available items based at least in part on associated demand transference values;
transforming the electronic data structure that defines the current assortment by iteratively swapping one or more of the item pairs, wherein each swap creates an updated assortment, and the current assortment becomes a previous assortment in a next iteration;
wherein each iteration includes:
qualifying a swapped item pair by:
removing the one item from the current assortment and adding the one item from the available items to create the updated assortment;
updating the intermediate results of the previous assortment using updated demand transference values generated from the swapped item pair;
wherein each iteration updates the intermediate results of the previous assortment to execute more efficiently without recalculating results for all items of the updated assortment;

applying assortment elasticity to the updated intermediate results to produce new demand transference values that include effects of swapping the swapped item pair as applied over the whole updated assortment;
in response to the new demand transference values for the updated assortment indicating a positive change to the associated metric value, (i) accepting the swap, and (ii) storing the updated intermediate results in the data structure for the next iteration of iteratively swapping, wherein the updated assortment is assigned as the current assortment in the next iteration;
upon completion of the iteratively swapping, storing the updated assortment in the electronic data structure as an optimized assortment; and
transmitting the electronic data structure that defines the optimized assortment to a remote computing device to cause a physical inventory of corresponding items to be modified and swapped according to the electronic data structure that defines the optimized assortment.

9. The computing system of claim 8, wherein the instructions for defining the item pairs for swapping further includes instructions configured to cause the processor to perform:
sorting the items in the current assortment based at least in part on the removal demand transference values associated with the items;
sorting the available items in the set of available items based at least in part on the addition demand transference values associated with the available items; and
defining the item pairs for swapping that include one item from the current assortment and one item from the available items based at least in part on the sorting.

10. The computing system of claim 8, wherein the instructions further comprise instructions configured to cause the processor to:
for a given item pair from the one or more item pairs, comparing a difference between associated demand transference values to a threshold; and
when the difference does not satisfy the threshold, then the swap for the given item pair does not proceed, and a next item pair proceeds to the iteration.

11. The computing system of claim 8, wherein the instructions further comprise instructions configured for, after applying the assortment elasticity:
in response to the new demand transference values for the updated assortment indicating a negative change for the associated metric value, rejecting the swap, and reversing the swapped item pair from the current assortment.

12. The computing system of claim 8, wherein the instructions further include instructions configured to cause the processor to perform:
receiving the current assortment and configuration parameters that define options for improving the current assortment, wherein the configuration parameters specify the associated metric value about the current assortment to improve, a list of required items, a final assortment size, a fraction-to-keep, and a target to meet.

13. The computing system of claim 8, wherein the instructions further include instructions configured to cause the processor to perform:
altering, after the transforming, the updated assortment to satisfy a predefined target, wherein the predefined target specifies a target value for a secondary metric value, and
wherein altering the updated assortment includes modifying a total number of items in the updated assortment until the predefined target is satisfied by iteratively adding and removing items in the updated assortment to meet the target value for the secondary metric value, wherein the predefined target is satisfied when the assortment is refined to a minimum number of items that satisfy the predefined target.

14. The computing system of claim 13,
wherein altering the updated assortment includes determining whether a value of the secondary metric is above or below the predefined target,
wherein items are incrementally added to the updated assortment until the predefined target is satisfied when the value is below the predefined target,
wherein items are incrementally removed from the updated assortment until the predefined target is satisfied when the value is above the predefined target, and
wherein items are added and removed according to associated demand transference values.

15. A non-transitory computer-readable medium having stored instructions for execution by the at least one processor, wherein the instructions when executed cause the at least one processor to perform:
reading data from an electronic data structure that defines a current assortment, wherein the current assortment defines a number of items from a product category that are part of a retail inventory, and wherein the current assortment as a whole has an associated metric value;
calculating a set of removal demand transference values for the items in the current assortment, wherein for each item in the assortment, applying a demand transference function to the item in isolation to generate a removal demand transference value for the item that represents a change in the associated metric value caused by individually removing the item from the current assortment;
storing the set of removal demand transference values as intermediate results of the current assortment in a data structure;
reading a set of available items that include items from the product category that not item included in the current assortment;
calculating a set of addition demand transference values for the items in the set of available items, wherein for each available item in the set of available items, applying the demand transference function to the available item in isolation to generate an addition demand transference value for the available item that represents a change in the associated metric value of the assortment caused by individually adding the available item to the current assortment;
defining item pairs for swapping that include one item from the current assortment and one item from the available items based at least in part on associated demand transference values;
transforming the electronic data structure that defines the current assortment by iteratively swapping one or more of the item pairs, wherein each swap creates an updated assortment, and the current assortment becomes a previous assortment in a next iteration;
wherein each iteration includes:
qualifying a swapped item pair by:
removing the one item from the current assortment and adding the one item from the available items to create the updated assortment;

updating the intermediate results of the previous assortment using updated demand transference values generated from the swapped item pair;

wherein each iteration updates the intermediate results of the previous assortment to execute more efficiently without recalculating results for all items of the updated assortment;

applying assortment elasticity to the updated intermediate results to produce new demand transference values that include effects of swapping the swapped item pair as applied over the whole updated assortment;

in response to the new demand transference values for the updated assortment indicating a positive change to the associated metric value, (i) accepting the swap, and (ii) storing the updated intermediate results in the data structure for the next iteration of iteratively swapping, wherein the updated assortment is assigned as the current assortment in the next iteration;

upon completion of the iteratively swapping, storing the updated assortment in the electronic data structure as an optimized assortment; and transmitting the electronic data structure that defines the optimized assortment to a remote computing device to cause a physical inventory of corresponding items to be modified and swapped according to the electronic data structure that defines the optimized assortment.

16. The non-transitory computer-readable medium of claim 15, wherein the instructions for defining the item pairs for swapping further includes instructions configured to cause the processor to perform:

sorting the items in the current assortment based at least in part on the removal demand transference values associated with the items;

sorting the available items in the set of available items based at least in part on the addition demand transference values associated with the available items; and defining the item pairs for swapping that include one item from the current assortment and one item from the available items based at least in part on the sorting.

17. The computing system of claim 15, wherein the instructions further comprise instructions configured to cause the processor to:

for a given item pair from the one or more item pairs, comparing a difference between associated demand transference values to a threshold; and when the difference does not satisfy the threshold, then the swap for the given item pair does not proceed, and a next item pair proceeds to the iteration.

18. The computing system of claim 15, wherein the instructions further comprise instructions configured for, after applying the assortment elasticity:

in response to the new demand transference values for the updated assortment indicating a negative change for the associated metric value, rejecting the swap, and reversing the swapped item pair from the current assortment.

19. The computing system of claim 15, wherein the instructions further include instructions configured to cause the processor to perform:

receiving the current assortment and configuration parameters that define options for improving the current assortment, wherein the configuration parameters specify the associated metric value about the current assortment to improve, a list of required items, a final assortment size, a fraction-to-keep, and a target to meet.

20. The computing system of claim 15, wherein the instructions further include instructions configured to cause the processor to perform:

altering, after the transforming, the updated assortment to satisfy a predefined target, wherein the predefined target specifies a target value for a secondary metric value, and wherein altering the updated assortment includes modifying a total number of items in the updated assortment until the predefined target is satisfied by iteratively adding and removing items in the updated assortment to meet the target value for the secondary metric value, wherein the predefined target is satisfied when the assortment is refined to a minimum number of items that satisfy the predefined target.

* * * * *

UNITED STATES PATENT AND TRADEMARK OFFICE
CERTIFICATE OF CORRECTION

PATENT NO. : 11,321,722 B2
APPLICATION NO. : 14/600099
DATED : May 3, 2022
INVENTOR(S) : Wu et al.

It is certified that error appears in the above-identified patent and that said Letters Patent is hereby corrected as shown below:

In the Specification

In Column 7, Line 60, delete "the an" and insert -- an --, therefor.

In Column 10, Line 50, delete "assortment" and insert -- assortment. --, therefor.

In the Claims

In Column 14, Line 36, in Claim 1, delete "not item" and insert -- are not --, therefor.

In Column 16, Line 36, in Claim 8, delete "not item" and insert -- are not --, therefor.

In Column 18, Line 43, in Claim 15, delete "not item" and insert -- are not --, therefor.

In Column 20, Line 1, in Claim 17, delete "computing system" and insert -- non-transitory computer-readable medium --, therefor.

In Column 20, Line 10, in Claim 18, delete "computing system" and insert -- non-transitory computer-readable medium --, therefor.

In Column 20, Line 17, in Claim 19, delete "computing system" and insert -- non-transitory computer-readable medium --, therefor.

In Column 20, Line 27, in Claim 20, delete "computing system" and insert -- non-transitory computer-readable medium --, therefor.

Signed and Sealed this
Sixteenth Day of August, 2022

Katherine Kelly Vidal
*Director of the United States Patent and Trademark Office*